United States Patent [19]

Moulton

[11] 3,757,331
[45] Sept. 4, 1973

[54] PHASE-CODED PULSE COMPRESSION APPARATUS
[75] Inventor: James A. Moulton, Santa Ana, Calif.
[73] Assignee: North American Rockwell Corporation, El Segundo, Calif.
[22] Filed: July 26, 1965
[21] Appl. No.: 474,821

[52] U.S. Cl........ 343/16 M, 343/5 DP, 343/17.1 R, 343/17.2 PC
[51] Int. Cl. .......................... G01s 9/22, G01s 9/233
[58] Field of Search ......... 343/5 DP, 17.1, 17.2 PC, 343/16, 100.7, 16 M, 17.1 R, 17.7 PC

[56] References Cited
UNITED STATES PATENTS
2,885,590  5/1959  Fuller ...................... 343/100 CL X
2,914,762  11/1959  Gross et al. ................ 343/100 CL X
3,371,343  2/1968  Sones ........................ 343/17.2 PC
3,680,104  7/1972  Westaway .................... 343/17.2 PC Primary Examiner—T. H. Tubbesing
Attorney—William R. Lane, L. Lee Humphries and Rolf M. Pitts

[57] ABSTRACT

Phase coded pulse compression apparatus for processing pulsed radar information, in which the transmitter employs a modified code which, when delayed by a seleted number of code bits and combined with the undelayed modified code, provides a desired code. The receiver employs a phase detector both inputs of which are responsive to the received echoes of the transmitted modified code, one of the inputs being delayed relative to the other by an amount corresponding to one code bit, to provide a video output having the desired code. A video pulse compression decoder, responsive to the desired code and coupled to the pase detector, effects the desired pulse compression.

13 Claims, 4 Drawing Figures

INVENTOR.
JAMES A. MOULTON

INVENTOR.
JAMES A. MOULTON

PHASE-CODED PULSE COMPRESSION APPARATUS

BACKGROUND OF THE INVENTION

In the design of conventional pulsed radar systems, the maximum range performance against targets of a preselected type is a function of the pulsed energy transmitted by such radar. As is well understood in the art, such pulsed energy is determined by the product of the transmitted power level and the pulsewidth thereof. Because a given radar transmitter design is usually peak-power limited, a desired energy requirement may be met, ofttimes, only by increasing the pulsewidth or duration of the transmitted pulse. While an increase in the pulsewidth of a given power level increases the maximum range performance of the radar, such pulsewidth increase also limits the range resolution or accuracy to which a range measurement may be made: the larger the pulse-width, the larger the range resolution or error in the range determination (indicated as the product of pulsewidth and propagation velocity).

Several techniques have been studied for improving the range resolution effect associated with a selected pulsewidth. Such techniques are referred to in the art as pulse compression techniques, and involve means of operating a radar with long pulses to obtain the resolution and accuracy of a short pulse while retaining maximum range or detection capability of a long pulse. By means of such techniques, the transmitted energy pulse is selectively modulated and the receiver is designed to respond to such modulation to compress the received pulse into one of a much shorter pulsewidth.

One such pulse compression technique is referred to as phase-coded pulse compression, in which a long pulse having a preselected duration or pulsewidth is divided into an integer number of subpulses of uniform interval or duration, each interval referred to herein as a bit. The phase of each subpulse interval or bit is then either left unchanged or else reversed in phase by 180° prior to transmission, in accordance with the corresponding position of such bit in a preselected binary code or sequence. Upon reception of the echoes of the phase-coded pulses, the radar receiver reverse-codes the phase-coded waveform and combines the several bit or subpulse intervals thereof, the response to a discrete target (having a radial extent less than that represented by the transmitted pulsewidth) appearing as a high energy return having a compressed pulsewidth.

A discussion, including a full bibliography of phase-coded pulse compression techniques and the selection of optimum coding is provided at pages 497 and 498 of "Introduction to Radar Systems" by Skolnik, published by McGraw-Hill (1962). As discussed in such reference, practical difficulties inhere in prior art applications of such techniques, due to the effects of radio frequency drift upon RF signal processing in the receiver. Such difficulties have manifested themselves in stringent frequency stability requirements for the transmitted pulse (referred to as leading-to-trailing edge frequency stability), stringent automatic frequency control requirements for the intermediate frequency (IF) stages of the receiver, and stringent phase-versus-frequency dispersion of the tapped delay lines employed in such RF processing of the received signals.

By means of the concept of the subject invention, a novel video processing technique is provided, which avoids the above-noted disadvantages of prior art phase-coded pulse compression systems.

In a preferred embodiment of the subject invention there is provided a selectively-coded radar system having improved range resolution performance and employing a modified transmittal code which, when delayed by a selected number of code bits and combined with the undelayed modified code, provides the selected code. The receiver of such system comprises a phase detector both inputs of which are commonly responsive to received echoes of the transmitted modified code, and a delay element interposed at one of the phase detector inputs. A video decoder comprising a tapped delay line is coupled to the bipolar video binary coded output of the phase detector to effect the desired pulse compression of the phase-coded receiver signals.

By means of the above described arrangement, pulse compression at IF or RF frequencies is avoided because decoding is done at lower (video) frequencies. Further, the reduced phase-versus-frequency dispersion of the shorter (integer-bit) IF delay line allows less stringent IF receiver frequency control. Moreover, leading-to-trailing edge frequency stability requirements for the transmitted pulse may be relaxed. Accordingly, it is an object of the subject invention to provide an improved phase-coded pulse compression system.

It is another object of the invention to provide a phase-coded pulse compression radar system utilizing a video decoder.

It is still another object of the invention to provide a video pulse compression decoder for decoding phase-coded radio-frequency signals.

It is a further object of the invention to provide a phase-coded pulse compression radar system requiring less stringent frequency stability performance.

These and other objects of the invention will become apparent from the following description, taken together with the accompanying drawings in which.

In the figures, like reference characters refer to like parts.

Figure 1:
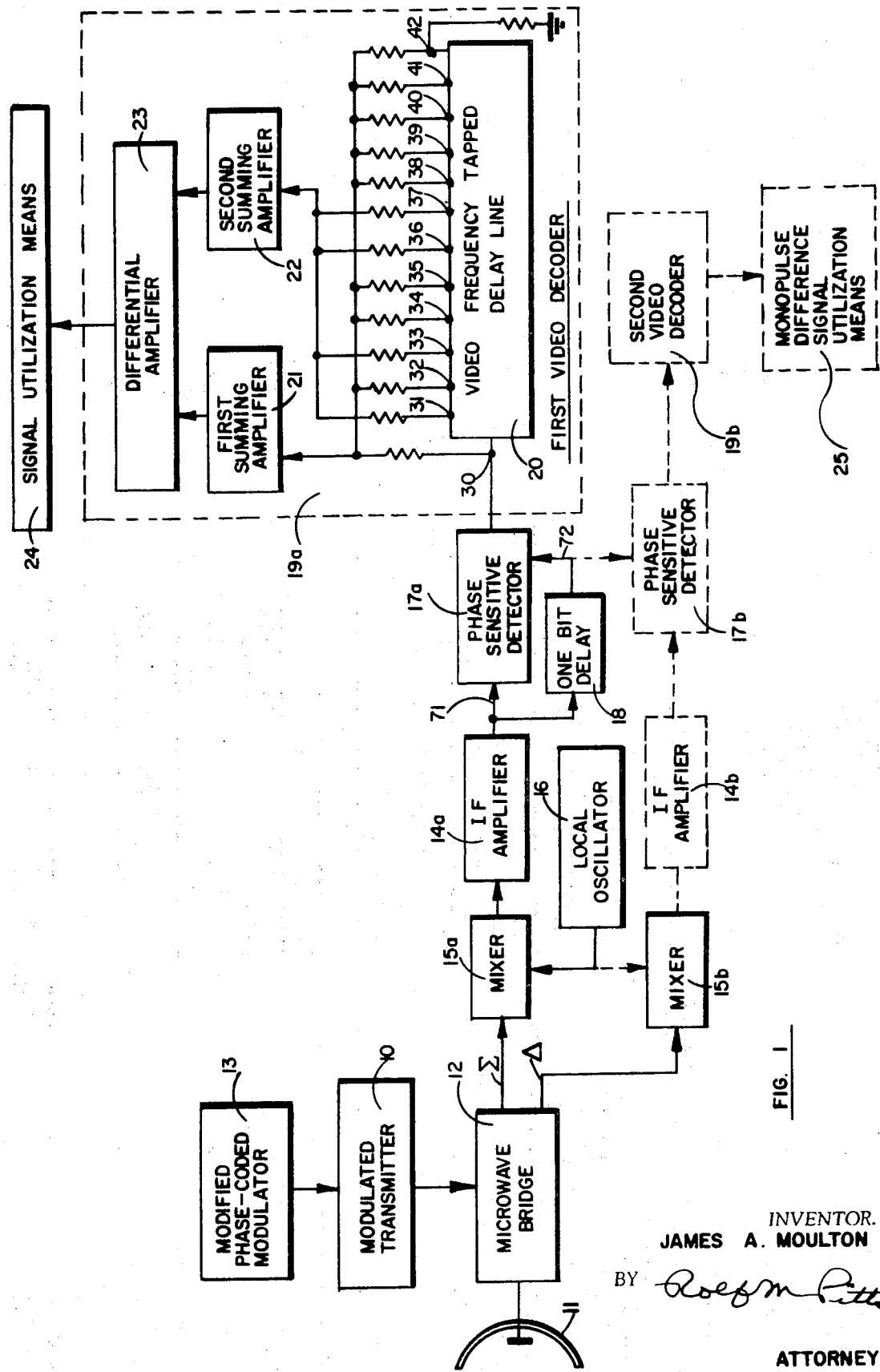
FIG. 1 is a block diagram of the system embodying the concept of the invention.

Referring now to FIG. 1, there is illustrated a block diagram of a system embodying the concept of the invention. There is provided a monopulse radar system including a pulsed transmitter 10 coupled to a monopulse antenna 11 through a microwave bridge 12, and modulated by phase-coded modulation means 13. Microwave bridge 12 also provides a first and second radio frequency output respectively indicative of the monopulse sum ($\Sigma$) and difference ($\Delta$) of received echoes of the transmitted energy received from a radar target. The construction and arrangement of each of elements 10, 11, 12 and 13 is known in the art, and therefore such elements are shown in FIG. 1 in block form only for convenience in exposition. The cooperation of a pulsed transmitter and phase-coded modulation means in a phase-coded pulse compression system is described in chapter 10 of the above noted text, Introduction to Radar Systems by Skolnik, and the selection of an optimum code is described in an article "The Synthesis of Linear Sequential Coding Networks" by D. A. Huffman, at pages 77–95 in the Proceedings of the Third London Symposium on Information Theory, published by Butterworth's Scientific Publications, London, 1956.

Although any preselected phase-coding may be employed, for purposes of illustration the exemplary embodiment of the illustrated invention is explained in terms of an exemplary 13-bit Barker code, such code length providing sufficient pulse compression in conjunction with a transmitted pulsewidth of, say, 2 microseconds duration. Such code may be comprised of plus (+) and minus (−) logic bits to indicate either a corresponding video polarity or a respective in-phase or antiphase continuous wave (C.W.) phase relationship as follows:

+ + + + + − − + + − + − +

There is further provided first and second intermediate frequency signalling means responsively coupled to a mutually exclusive one of the monopulse sum ($\Sigma$) and difference ($\Delta$) outputs of microwave bridge 12. Each of the intermediate frequency signalling means comprises an intermediate frequency amplifier 14 responsively coupled to a microwave mixer 15 which cooperates with the local oscillator 16 of an automatic frequency control loop for reducing the associated monopulse radio frequency input thereto to an intermediate (IF) frequency, as is well understood in the art.

When a phase-coded signal, employing the above described exemplary code, is fed into a tapped delay line decoder of the same code and summed, the resultant output will be a single output subpulse of one code bit (one thirteenth of one pulsewidth) in duration, occurring at the thirteenth or last code bit, and having an amplitude thirteen times the received pulse amplitude. However, prior art attempts with such technique at RF or at IF frequencies such as 60 megacycles per second or 30 megacycles per second have experienced several practical difficulties. These difficulties involve the need for ultra precise control of the IF receiver frequency in order to avoid IF phase rotation through the receiver decoder delay line, in conjunction with ultra-stable code generation and modulated transmission means.

The novel structure of the inventive embodiment of FIG. 1 for avoiding such practical difficulties lies in the use of a phase detector 17 responsive to the phase-coded IF signals for converting them to polarity-coded video-detected signals, in conjunction with a modified phase-code transmission. As illustrated in FIG. 1, both inputs of phase detector 17a are commonly responsive to the received signal output of IF amplifier 14a, a delay element 18 being interposed between the output of amplifier 14a and a selected one of the two inputs of detector 17a for providing an incremental time delay corresponding to one code bit or sub-pulse interval of the transmitted code. In this way, the phase coding of a preceding received code bit, or subpulse interval, of the received echo is used as a phase reference in detector 17a for the phase-sensitive detection of the next or successively received subpulse interval; and the detector output associated with a given received subpulse interval will be a video-detected subpulse having a polarity indicative of the presence or absence of phase-coincidence between a received subpulse and the preceding pulse employed as a phase reference. Hence, the output of detector 17a in response to a received phase-coded pulse echo is a phase-coded bipolar video signal, the phase coding of which is altered or recorded relative to the transmitted code. Accordingly, a transmitted code is selected which, when delayed by one code bit thereof (by delay element 18) and combined with the undelayed transmitted code (by detector 17a), will provide the preselected code so desired. Where, for example, the above indicated thirteen-bit Barker code is selected for exemplary phase-coded pulse-compression purposes, the transmitted code employed is one which, if delayed one code bit and combined with the undelayed transmitted code, provides the classical Barker code, as follows:

Transmitted and Received Code
18 + + + + + + − + + + − − + +

Delayed IF Reference to Phase Detector
18 + + + + + + − + + + − − + +

Barker-coded phase detector output
18 + + + + + − − + + − + − +

It is noted that one less bit is reproduced than is transmitted. In other words, the transmitted code is of one more bit in length than the code of interest. However, for the large code word of interest (13 bits), the loss in efficiency thus represented is deemed small, or at least acceptable in view of the countervailing advantages to be derived.

In an exemplary system employing a 60 mc IF frequency 14 bit transmitted code, and 2 microsecond transmitted pulsewidth, delay element 18 may be comprised of a 50 ohm coaxial cable of approximately 90 feet in length, for providing a one-bit delay of 0.14 microseconds and a relative phase shift of zero ± 10°. Because of the extremely short (one bit) length of IF delay element 18, the cooperation of such element with detector 17a is not overly critical to variations in the IF frequency or in the code generation, as to avoid phase-rotation through such delay line. Further because of such short length, variations in the length or geometry thereof due to temperature sensitivety are not critical.

By means of the cooperation of phase detector 17a and IF delay element 18, in response to a suitably modified code of 14 bits (+ + + + + + − + + + − − + +), a polarity-coded video signal, representing a 13 bit Barker code, is obtained. Such video signal output of detector 17a may then be conveniently decoded by video decoding means 19, comprising a tapped delay line 20 having thirteen taps (including the input terminal) 30–42 providing thirteen outputs, a uniform delay between adjacent ones of successive taps corresponding to one transmitted bit of the transmitted code, or the transmitted pulsewidth divided by the number of bits in the transmitted code. For example, for the exemplary 2 microsecond transmitted pulsewidth, and a 14 bit recoded transmitter waveform, the time delay spacing between adjacent taps of a 13 bit Barker-coded decoder would be 2/14 or 0.143 microseconds, and the Barker-code word or pulse length would be 1.86 microseconds, or one bit (one subpulse interval of 0.14 microsecond) less than the recoded transmitted pulsewidth of 2 microseconds.

The outputs of like coded taps are resistively summed at the input to a respective summing amplifier, a first summing amplifier 21 summing the first plus (+) coded first, third, fifth, sixth and ninth through the thirteenth taps (elements 30, 32, 34, 35 and 38–42) and a second summing amplifier 22 summing the negative (−) coded second, fourth, seventh and eighth taps (elements 31, 33, 36 and 37) of video delay line 20. The outputs of summing amplifiers 21 and 22 are fed to a differential amplifier 23 for providing an output signal indicative of the differential signal input thereto, which output signal may be employed by signal utilization means 24 such as, for example, a PPI display device. Where second summing amplifier 22 is a phase-inverting amplifier, then differential amplifier 23 may be comprised of a summing amplifier.

In normal operation of the arrangement of FIG. 1, video decoder 19a responds to the Barker-coded bipolar video output of phase-detector 17a to provide a pulse-compressed output which has a peak amplitude during the last received code bit or subpulse interval of a phase-detected received pulse. Such response may be more clearly appreciated by aid of FIG. 2.

Figure 2:
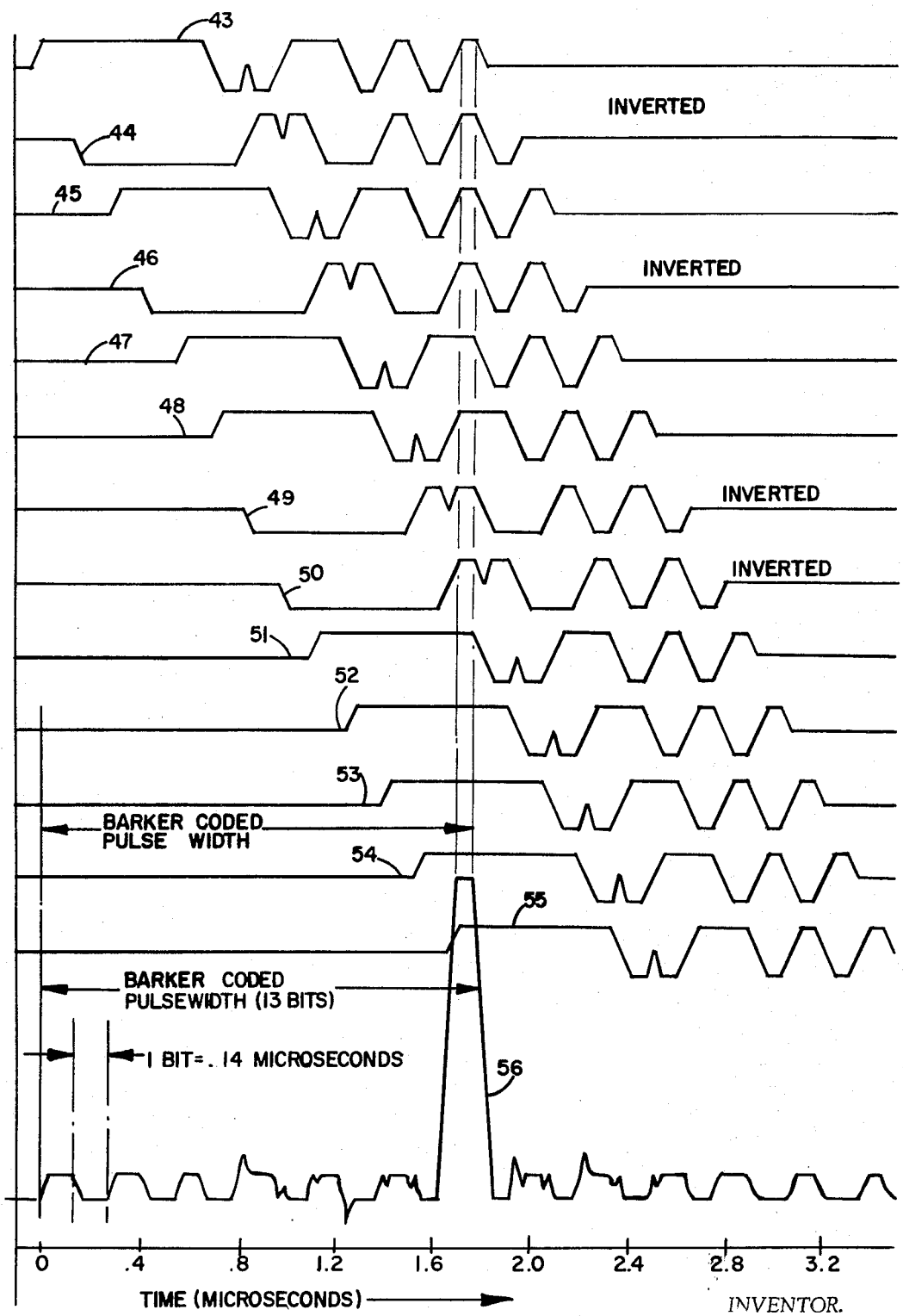
FIG. 2 is a family of time histories of the response of the decoder of FIG. 1.

Referring to FIG. 2, there is illustrated a family of time histories of the inputs and outputs of certain elements of video decoder 19 of FIG. 1. Curve 43 represents the Barker-coded bipolar video output of phase detector 17a applied to the input terminal 30 of tapped delay line 20, the occurrence of the first bit of which is arbitrarily selected as zero time or a reference point in time. Curves 44 to 55 inclusive represent successively delayed outputs of tapped delay line 20. Curves 44, 46, 49 and 50 are phase-inverted for convenience to represent the inverted sense imparted to the second, fourth, seventh and eighth signals (on taps 31, 33, 36 and 37 in FIG. 1) by the cooperation of second summing amplifier 22 and differential amplifier 23. Curve 56 represents the combined output of differential amplifier 23 in response to the difference between the inputs thereto from summing amplifiers 21 and 22, and corresponding to the sum of curves 43–55, inclusively.

It may be seen from inspection of FIG. 2, that the sum of the corresponding amplitude of Curves 43, 45, 47, 48 and 51–55 and inverted curves 44, 46, 49 and 50 at any point in time provide, in general, a relative low level amplitude indicated by curve 56, which low level amplitude varies from zero to twice the amplitude of input curve 43; but that during the interval between 1.72 and 1.86 microseconds (corresponding to the occurrence of the last or thirteenth bit in the Barker-coded envelope of curve 43, which represents the input to the video decoder 19a from phase detector 17a in FIG. 1), the combined amplitudes of curves 43–55 produce a peak amplitude in curve 56, corresponding to the amplitude of a single bit or subpulse of input curve 43 multiplied by the number bits in the coded input to decoder 19a. In other words, a pulse compression effect occurs in response to a point-source target, a coded transmitted pulse of 14 bits producing a recorded receiver signal of 13 bits which is pulse compressed into one bit. It is to be appreciated that the result for a return echo received from other than a point source, namely a target of extended radial extent such as ground clutter, would not provide the ideal result indicated at the thirteenth bit of curve 56 in FIG. 2. Accordingly, it is to be understood that the arrangement of FIG. 1 provides an enhanced response to small targets, whereby such targets may be better distinguished from the clutter background in which they may be found.

Because decoder 19a of FIG. 1 processes a video detected signal from phase detector 17a, rather than an RF or IF signal, the 12 bit length of tapped delay line 20 does not readily lend itself to producing complete phase reversals, or phase rotations, which might otherwise be caused by either frequency drift in the coded signals or temperature-sensitive geometric instabilities in the delay line itself. In view of the video signal processing by such 12 bit line, it is only necessary to maintain a geometrical stability of, say, plus or minus one-fourth bit, which in a twelve bit line represents + 2 percent, which tolerance is well within those achievable for commercially available lumped constant delay lines.

Referring again to FIG. 1, there is illustrated means for applying the above-described phase-coded pulse compression technique to a monopulse receiver. Where a monopulse antenna 11 and associated microwave bridge 12 are employed to provide a monopulse difference signal, indicative of the angle-off-boresight of a detected target, in addition to a sum signal (as described more fully in "Introduction to Monopulse" by Rhodes, published by McGraw-Hill (1959)), such RF monopulse difference signal may be processed by IF means, comprising a mixer 15b coupled to local oscillator 16, and an IF amplifier 14b responsively coupled to the output of mixer 15b to provide an amplified intermediate frequency monopulse difference signal, as is well understood in the art.

By feeding this IF output of difference channel amplifier 14b to an input of a second phase sensitive detector 17b, a second input of which is responsively coupled to delay element 18, a video-detected output signal is provided. Such difference channel video signal is phase-coded as a preselected (Barker) code, and has a phase-sense (or relative polarity), relative to the sum signal, which corresponds to the sense of the angle-off-boresight of the detected target producing such signal. Such bipolar video-detected phase-coded signal may then be further processed by a video decoder 19b, similarly as the processing of the video sum (Σ) signal by decoder 19a, to provide a pulse-compressed monopulse difference signal having a sense or polarity, as well as magnitude, indicative of the angle-off-boresight of the detected target indicated by the pulse-compressed sum signal. Such video-detected monopulse difference signal may be utilized by monopulse difference signal utilization mean 25, such as is taught for example in U. S. Pat. No. 3,165,740 issued Jan. 12, 1965, to W. E. Stoney for a Terrain Clearance Radar.

Figure 3:
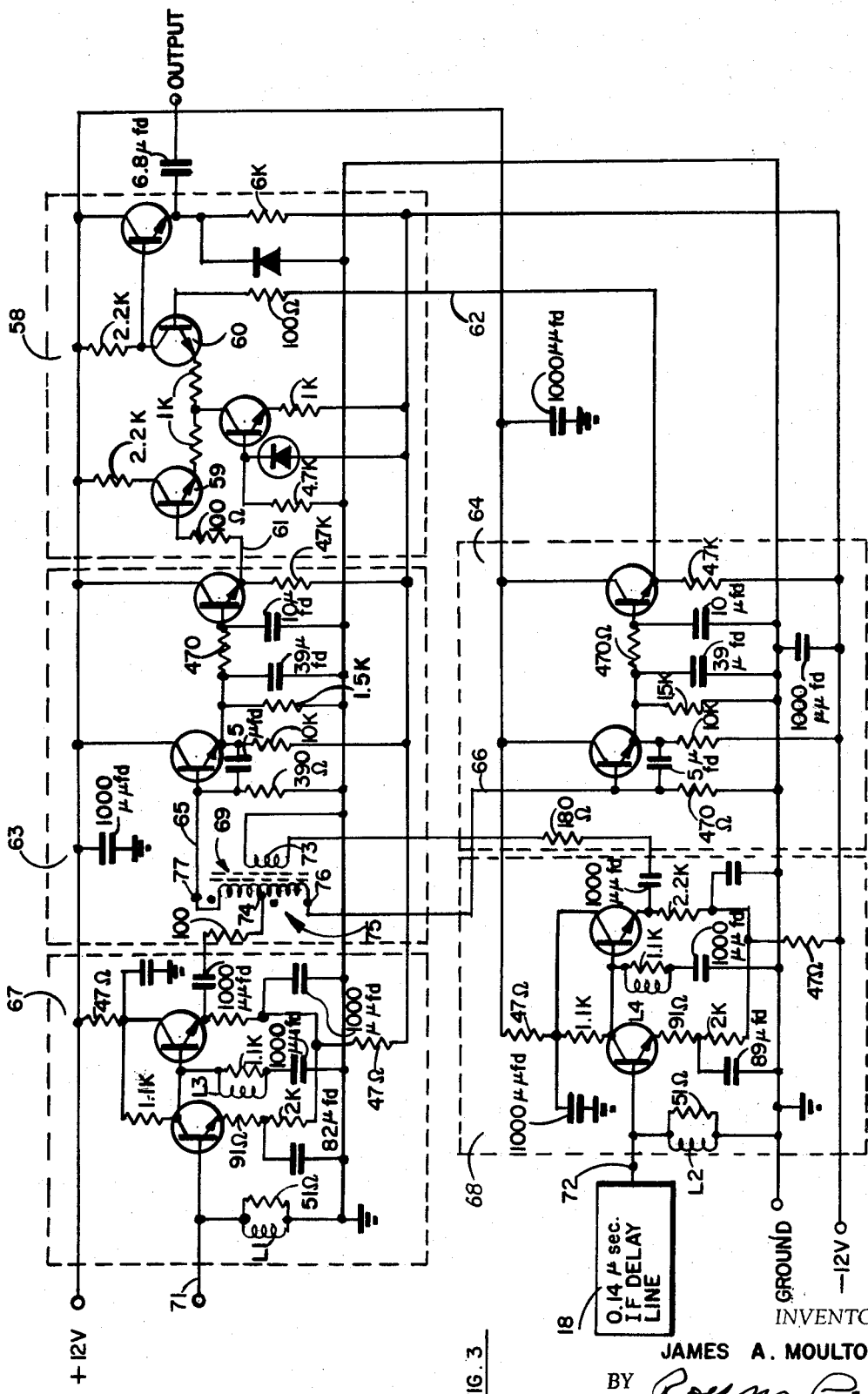
FIG. 3 is a schematic diagram of a preferred arrangement of the phase-sensitive amplitude detector of FIG. 1.
Figure 4:
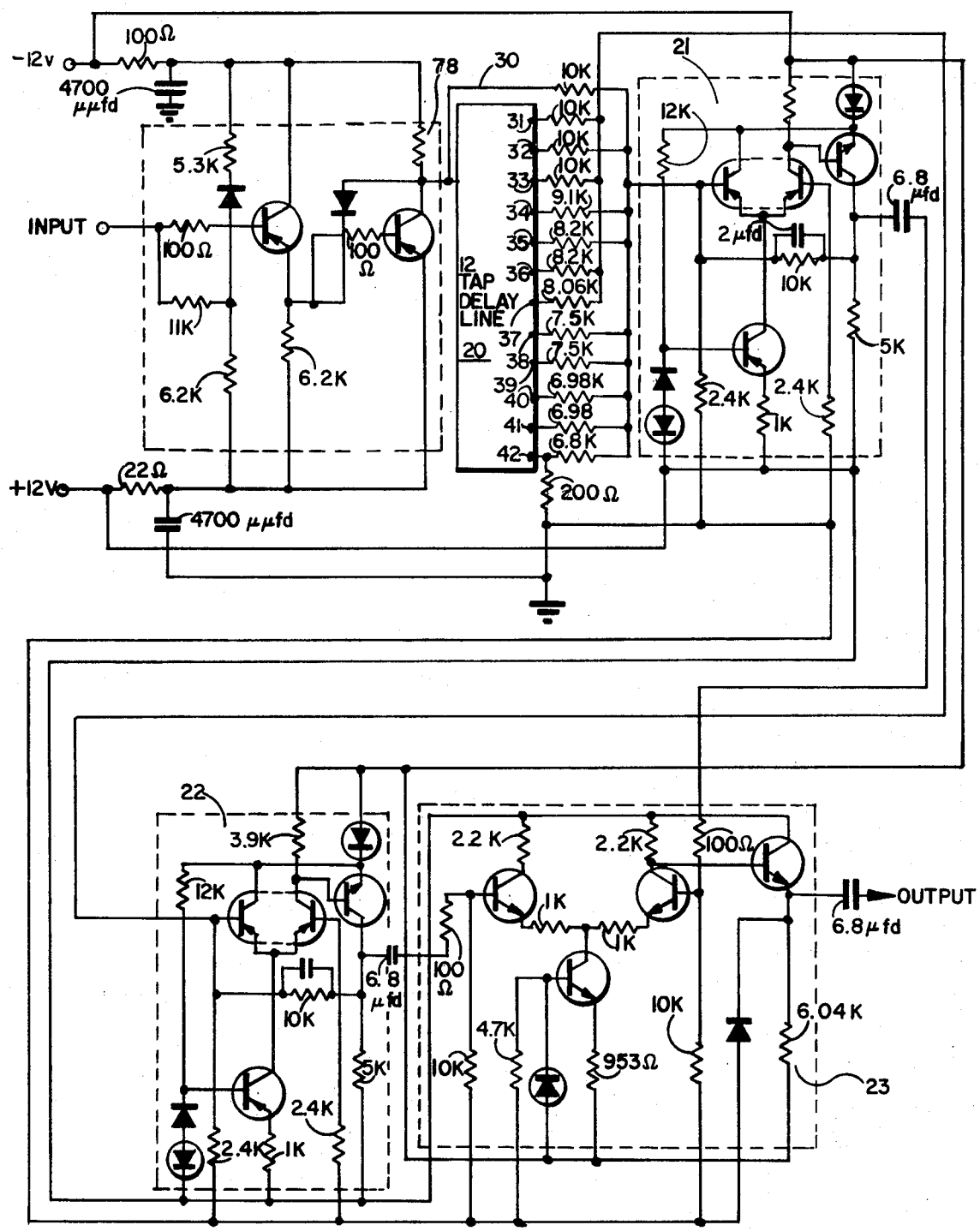
FIG. 4 is a schematic diagram of a preferred arrangement of the decoder of FIG. 1.

Phase detectors 17a and 17b are similarly constructed and arranged, as are video decoders 19a and 19b; a detailed schematic diagram of a respective preferred embodiment of such phase detector arrangement and decoder arrangement being shown in FIG. 3 and 4, respectively.

Referring to FIG. 3, there is illustrated a schematic diagram of a preferred circuit for each of phase detectors 17a and 17b of FIG. 1. There is provided a differential amplifier 58 comprising transistors 59 and 60 and having a first and second video input line 61 and 62, respectively, coupled to a respective output of a first and second IF detector 63 and 64. A respective IF input 65 and 66 of each of detectors 63 and 64 is transformer-coupled to a mutually exclusive one of the two input terminals 71 and 72 of the phase detector. Such transformer-coupling is provided by means of a matrix transformer 69 having a primary winding 73 coupled to one of input terminals 71 and 72 through an IF driver-amplifier stage 68, and a center tap terminal 74 of a center-tapped secondary winding 75 coupled to the other of the phase detector input terminals 71 and 72 through a second IF driver amplifier 67, each of the end terminals 76 and 77 of the secondary winding 75 of transformer 69 being connected to an input of a mutually exclusive one of detectors 63 and 64.

Each of IF driver stages 67 and 68 is designed to have a center frequency corresponding to the system IF frequency of the system of FIG. 1, (which in an exemplary arrangement may employ a 60 mc IF frequency) and having a gain of 15 db and a bandwidth of 40 mc.

In normal operation of the arrangement of FIG. 3, the sum of the IF inputs appearing at transformer terminal 77, is detected by detector 63; and the difference between the two IF inputs, appearing at transformer terminal 76, is detected by detector 64. The detected outputs of detectors 63 and 64 are compared at differential amplifier 58 which provides an output indicative of the difference between the inputs thereto. Such phase-sensitive detected output is then applied to a decoder, corresponding to element 19 of FIG. 1, and more fully illustrated in FIG. 4.

Referring to FIG. 4, there is illustrated a schematic diagram of a preferred circuit arrangement of the video decoders of FIG. 1. There is provided a tapped delay line 20, first and second summing amplifiers 21 and 22, and differential amplifier 23, all arranged to cooperate substantially the same as like referenced elements of FIG. 1. The construction and arrangement of differential amplifier 23 is identical to that of differential amplifier 58 of FIG. 3. Interposed between input terminal 30 of tapped delay line 20 and the input from an associated phase detector is a bipolar driving emitter-follower stage 78.

The specific circuit values for the illustrated circuit parameters of FIGS. 3 and 4 are those that have been successfully employed in cooperation with an IF receiver frequency of 60 mc, and a 14 bit phase coded pulse-width of 2 microseconds duration for the recovery of a 13 bit Barker code for pulse compression purposes. The progressively reduced resistances of the summing resistors employed with the taps of tapped delay line 20 are selected to provide compensatory signal-scaling, or gain adjustment, to compensate for the progressively greater delay line attenuation suffered by the outputs at successive ones of the taps along tapped delay line 20. In this way, the amplitude of each bit is made more nearly uniform.

Accordingly, there has been described improved phase-coded pulse compression means for providing improved radar range resolution and accuracy. Such improved means employs a video decoder in conjunction with a video phase coded signal having a preselected number of bits which is derived from a transmitted code having one more bit than the preselected code and which, when transmitted as a phase coded RF signal, delayed by one bit, and the delayed RF signal phase-sensitive detected relative to the undelayed RF signal, provides a video signal of the preselected or desired phase code. Such code recovery or recoding at the video stage tends to avoid the phase rotations and reversals associated with IF signal processing due to IF frequency drift and C.W. transmitter frequency coding instability. Although the device has been described in terms of utilizing a Barker code, it is clear that the scope of the invention is not so limited, and that other codes may be employed. Further, although the device has been illustrated as employing a transmitted code having one more bit than the preselected system code, and which when received and delayed by one-bit, the delayed receiver signal combined with the undelayed signal to recover the preselected system code, the concept of the invention is not so limited. It is clear that the inventive concept contemplates the utilization of a transmitted code having a preselected number of bits more than a preselected code, which when received and delayed by an amount equal to such added number of bits, and the delayed receiver signal combined with the undelayed signal, will provide the preselected code.

Although the invention has been described and illustrated in detail, it is to be clearly understood that the same is by way of illustration and example only and is not to be taken by way of limitation, the spirit and scope of this invention being limited only by the terms of the appended claims.

I claim:

1. In a phase-coded pulse-compression type pulsed radar system employing a modified code which, when delayed by a preselected number of code bits and combined with the undelayed code, provides a preselected code, a receiver comprising:

A phase sensitive detector, both inputs of which are responsive to received echoes of a transmitted modified code; and Delay means interposed at one of said detector inputs for providing a time delay corresponding to said preselected number of code bits of said transmittal code;

Whereby a preselectively phase-coded video detected signal output is provided.

2. In a phase-coded pulse-compression type pulsed radar system employing a modified transmittal code which, when delayed by one code bit, and combined with the undelayed code, provides a preselected code, a receiver comprising:

A phase sensitive detector, both inputs of which are responsive to received echoes of a transmitted modified code; and Delay means interposed at one of said detector inputs for providing a time delay corresponding to one code bit of said transmittal code;

Whereby a preselectively phase-coded video detected signal output is provided.

3. The device of claim 2 in which said radar system is a monopulse receiver of the sum and difference type, a first input of said detector being responsive to the sum of said received echoes and a second input of said detector being responsive to the difference between said received echoes, whereby a preselectively phase-coded monopulse difference signal output is provided.

4. The device of claim 3 in which there is provided means for detecting the sense of the angle-off-boresight of a detected target providing said echoes and comprising said detector and said delay means.

5. In a phase-coded pulse compression type pulsed radar system employing a modified code which, when delayed by one code bit, and combined with the undelayed code, provides a preselected code, a receiver comprising:

A phase detector, both inputs of which are commonly responsive to received echoes of a transmitted modified code One-bit delay means interposed at one of said detector inputs, whereby a preselectively coded bipolar video detected signal is provided at the output of said phase detector.

6. In a phase-coded pulse compression type pulsed radar system, the combination comprising Means for transmitting a modified code which, when delayed by one code bit and combined with the undelayed modified code, provides a preselected code, Receiving means responsive to echoes of said transmitted code, and including a phase detector, both inputs of which are commonly responsive to said received echoes; and Delay means interposed at one of said detector inputs for providing a time delay corresponding to one code bit of said transmitted code.

7. The device of claim 6 in which there is further provided video decoding means responsive to the preselectively coded bipolar video detected output of said phase detector for combining the in-phase and anti-phase bits of said bipolar video detected signal to provide a received radar signal having improved range resolution.

8. The device of claim 6 in which there is further provided video decoding means comprising A tapped delay line, the delay intervals between successive taps of which corresponding to one bit of said transmitted code, and Signal combining means to respectively sum the corresponding in-phase and anti-phase bits of the video output of said detector, and subtractively combine said summed signals.

9. The device of claim 6 in which there is further provided

A tapped delay line having a plurality of taps corresponding to the number of bits in said preselected code, the delay interval between successive taps corresponding to one bit of said transmitted code, First signal combining means responsive to said taps of said delay line for combining outputs representing code bits having a first selected sense, Second signal combining means responsive to said taps of said delay line for combining outputs representing code bits having a second selected sense opposed to said first sense, and Differential signal combining meaning means responsive to said first and second combining means for providing an output indicative of the difference therebetween.

10. In a phase-coded pulse compression type radar system employing a modified code which, when delayed by one code bit and combined with the undelayed code, provides a preselected code, monopulse receiving means for providing monopulse sum and difference signals respectively indicative of the sum and difference between received echoes of a transmitted modified code and comprising A phase sensitive detector having a first and second input respectively responsive to said monopulse sum and difference signals; and Delay means interposed at one of said detector inputs for providing a time delay corresponding to one code bit of said transmitted code, Whereby the output of said detector is a video-detected monopulse difference signal phase-coded in accordance with said preselected code and having a phase sense indicative of the angle-off-boresight of a detected target producing said echoes.

11. The device of claim 10 in which there is further provided

A tapped delay line having a plurality of taps each corresponding to a successive one of the bits in said preselected code, the delay interval between successive taps corresponding to the bit time of said transmitted code, First signal combining means responsive to said taps of said delay line for combining outputs representing code bits having a first selected sense, Second signal combining means responsive to said taps of said delay line for combining outputs representing code bits having a second selected sense opposed to said first sense, and Differential signal combining meaning means responsive to said first and second combining means for providing an output indicative of the difference therebetween.

12. An auto coherent phase coding circuit for connecting a source of received echo signals from radar transmission of a series of wide, coded pulses to a decoder unit, comprising, means for modifying said coded pulses, phase detector means, a direct path from said source of modified coded pulse signals to said phase detector means, a delay path from said source of modified coded signals to said phase detector means and connected in parallel with said direct path, delay means interposed in said delay path for delaying said modified coded pulse signals, means in said phase detector means whereby said modified coded pulse when phase detected against itself produces the original series of coded pulse free of any Doppler frequency shift effects, and an output path from said phase detector means to said decoder unit whereby when the pulses from the output of said phase detector means are decoded said original wide pulse is collapsed into narrow pulse with an accompanying increase in effective peak signal.

13. The circuit as described in claim 12 wherein said delay means comprises means for delaying said modified coded pulses by one time increment.

* * * * *